INVENTOR.
Robert B. Berg

Jan. 12, 1960     R. B. BERG     2,920,708
CULTIVATOR OR CHOPPER
Filed Nov. 20, 1956     4 Sheets-Sheet 3

INVENTOR.
Robert B. Berg
BY
ATTORNEYS

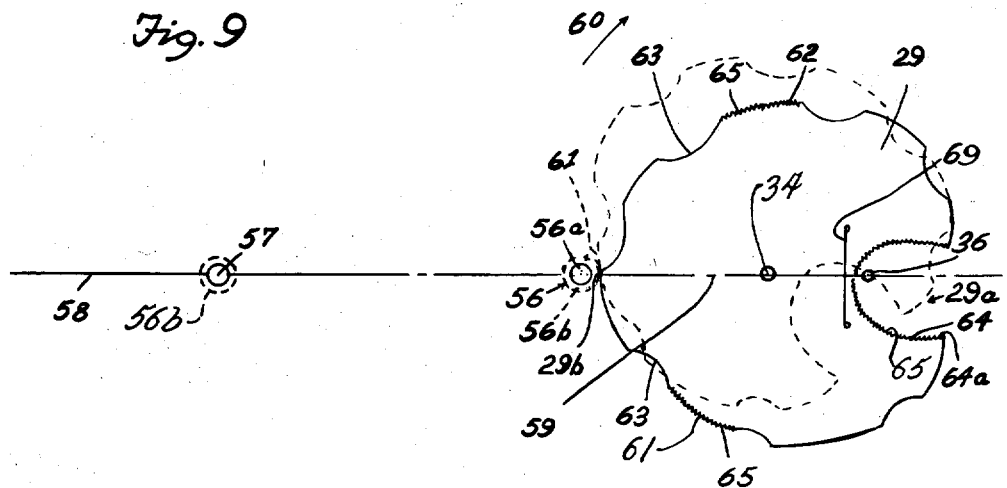
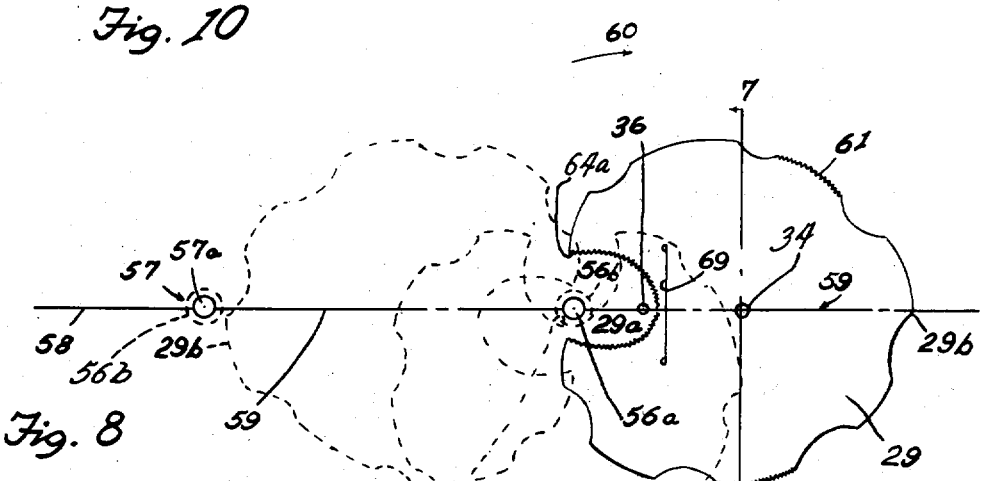
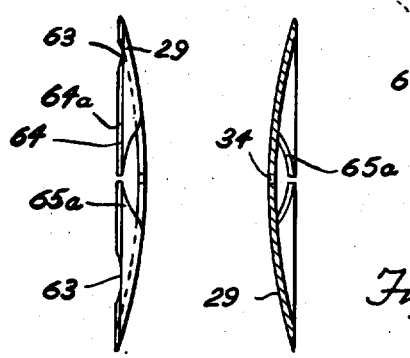

United States Patent Office 2,920,708
Patented Jan. 12, 1960

2,920,708

CULTIVATOR OR CHOPPER

Robert B. Berg, New Smyrna Beach, Fla.

Application November 20, 1956, Serial No. 623,463

14 Claims. (Cl. 172—111)

My present invention relates primarily to cultivators for plants such as head lettuce, cabbage, peppers, etc., which are disposed in rows and in uniformly and substantially spaced relationship in each row. However, the device is also available for use as a chopper for thinning such as beets, cotton, etc., the instant development being an improvement over the cultivator shown in my Patent No. 2,713,816, dated July 26, 1955.

The use of modern row crop planters or transplanters enables the plantings of each row to be uniformly spaced from one another. However, prior to the invention of my above mentioned patent, no cultivator had been developed which would automatically cultivate in a complete circle around, and closely adjacent to row plants, so as to eliminate altogether the expensive necessity for hand hoeing. Although my patented cultivator renders satisfactory service, it is expensive to manufacture because it involves the use of a multiplicity of more or less costly moving parts, some of which require rather frequent replacement to assure efficient operation of the device.

The present invention therefore has for its primary objects to improve my patented cultivator by simplifying its construction, thus reducing the cost of manufacture, and further to provide a device which embodies but a minimum of durable and long lived working parts which are unlikely to get out of order; and additionally, to provide a cultivator which will operate continuously at higher speeds than the cultivator of my patent.

Additionally, the invention contemplates a cultivator or chopper which is applicable as an attachment to the various types of farm tractors to be controlled as to vertical movement to and from ground-engaging position by means of the lift mechanism with which such tractors are provided and which further involves a driven cultivating element which is operated by the power take off of the tractor.

Another aim of the invention is to provide a tractor or the like with a driven vertically journalled crank shaft providing a crank arm to the outer portion of which is secured the vertical carrier post of a horizontal cultivating member so that as the tractor proceeds down a plant row with the crank shaft aligned therewith and driven at a predetermined constant speed in reference to forward tractor speed, unwanted groups of plants or weeds will be chopped out at predetermined intervals.

Various other objects and advantages of the invention will be apparent to those versed in the art as the description of the illustrated embodiment proceeds, it being understood that the invention resides in certain novel features of construction, combination and arrangement of the various parts and in methods and modes of operation thereof.

In accordance with the requirements of the patent statutes, I have illustrated in the accompanying drawings the presently preferred example of my inventive concept, same taking the form of an attachment for the conventional four wheeled farm tractor. However, the disclosure is to be taken as illustrative rather than limitative as the invention is obviously susceptible of other mechanical expressions within the spirit and scope of the subject matter claimed hereinafter.

In the drawings, wherein the same reference characters have been used to designate the same parts throughout the several views—

Fig. 7 is a cross-sectional view through the hoe or cultivator member, taken on the line 7—7 of Fig. 10;

Fig. 8 is a front edge elevational view of the hoe or cultivator member;

Fig. 9 is a diagrammatic view illustrating in top plan the initial phase of cultivation of a particular plant, say the first plant of a row, and namely, that phase which takes place as the cultivator-element-carrying crank moves 180 degrees from forward dead center to rear dead center;

Fig. 10 is a view similar to Fig. 5 but showing the second phase of the cultivating action about the plant of Fig. 1 and the first phase of cultivation about the next plant of the row, namely, that occurring as the cultivator element-carrying-crank completes its swing back to forward dead center.

Figure 1:
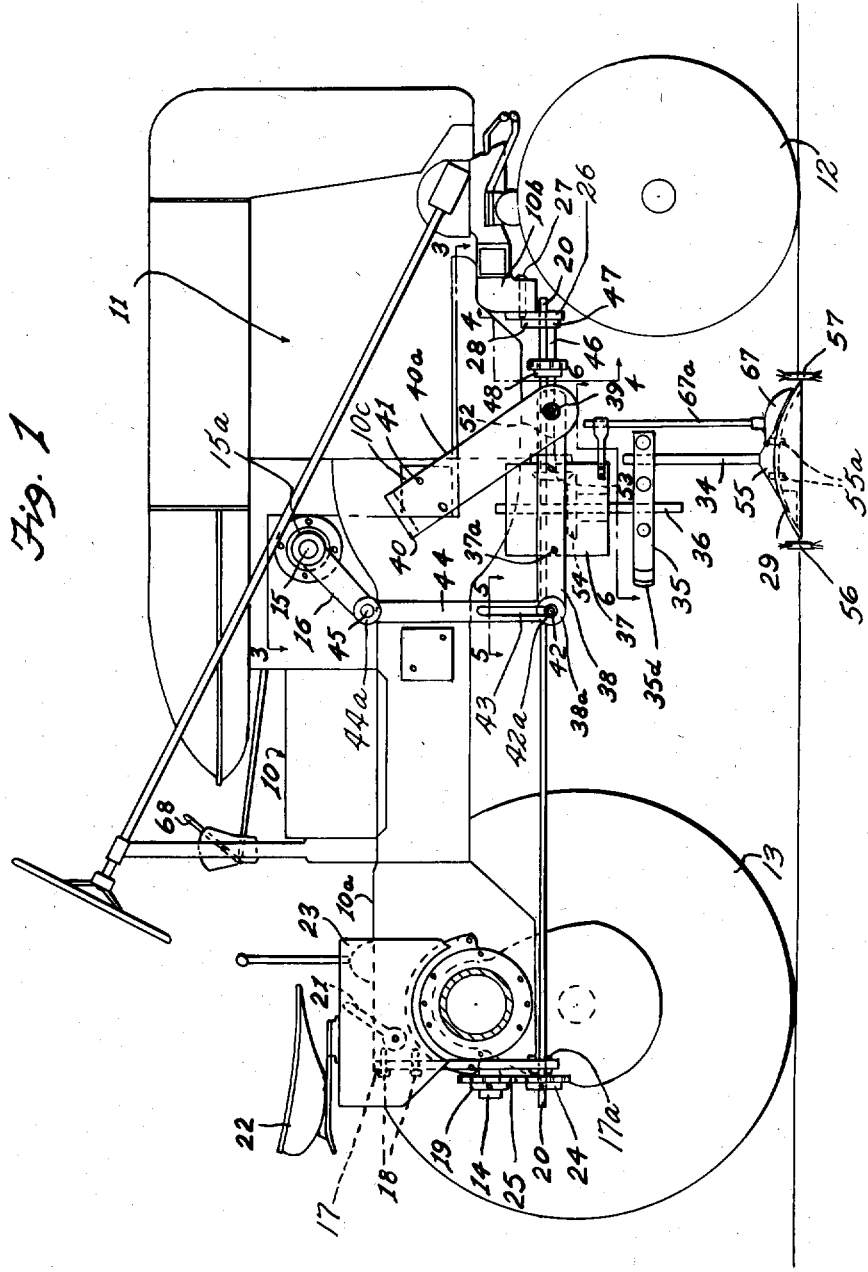
Fig. 1 is a side elevational view of a conventional farm tractor with one rear wheel removed and illustrating the application of my cultivator improvements thereto; the sprocket chain tightener of Fig. 2 having been deleted.

Referring to the drawings by reference characters, numeral 9 indicates generally a familiar type of farm tractor having the frame 10, the power plant 11, front wheels 12, rear wheels 13, and the conventional power plant-operated power take-off shaft 14 at the rear end of the differential casing 10a. Operation of the power takeoff shaft 14 is controlled as usual by the clutch lever 21 which is located adjacent the driver's seat 22. The driver's seat has the U-form, rear axle-carried support which is indicated as 23 in Figs. 1 and 2.

Figure 2:
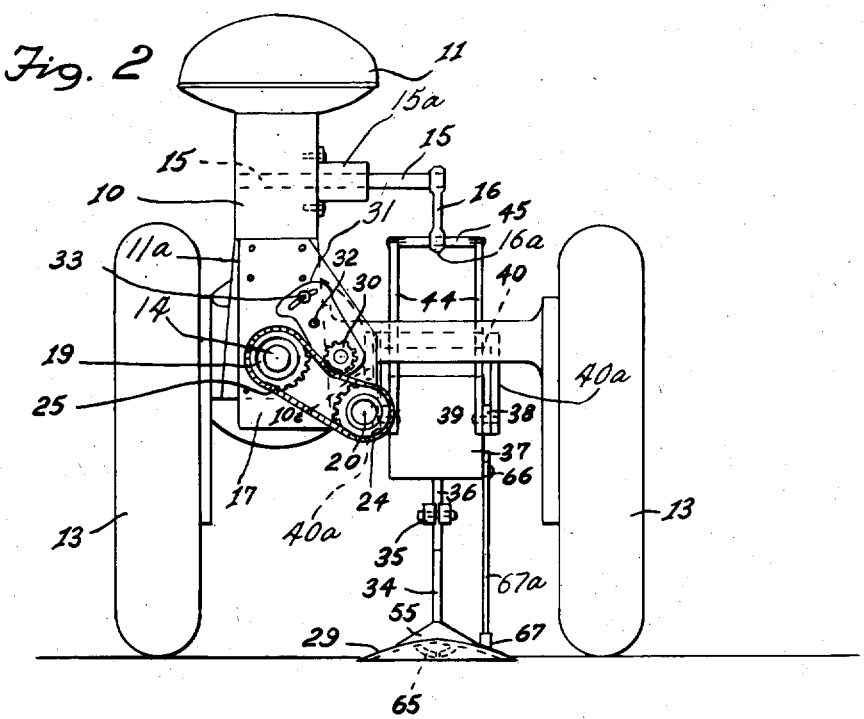
Fig. 2 is a rear elevational view of the tractor showing its power take off shaft and the drive connection between same and the power supplying shaft of the cultivator, the driver's seat having been deleted and its support having been deleted for the sake of clarity.

The tractor 9, as is customary, is provided with a hydraulically operated frame-carried lift shaft 15 which, in the present instance, extends a substantial distance rightwardly of frame 10 as viewed in Fig. 2. A tractor frame-carried bearing 15a sustains the extended portion of lift shaft 15 and the latter has keyed thereon the lift arm 16. Ordinarily the lift shaft such as 15 controls forward and rear implement-carrying lift means (not shown) which are not utilized in the particular tractor and cultivator combination which I have chosen for purposes of illustration.

Coming now to the cultivator apparatus improvements, per se, and turning to Figs. 1 and 2, it will be noted that a bearing-providing bracket plate 17 is bolted as at 18 to the differentail casing 10a at the rear end of the tractor frame 10 adjacent the usual power takeoff shaft 14. Also, as shown, a sprocket gear 19 is mounted on the power takeoff shaft 14.

The lower end of the bracket plate 17 provides the bearing 17a for the rear end of the forwardly extending cultivator member-driving countershaft 20.

The rear end of the countershaft 20 has fast thereon the sprocket gear 24 which, as shown in Figs. 1 and 2, is driven by sprocket chain 25 from the sprocket gear 18 of the power take-off shaft 14. A depending and laterally extending bracket 26 is secured as at 27 to the frontal tractor frame portion 10b as indicated in Fig. 1, and provides the bearing 28 for the forward end of the cultivator element driving countershaft 20.

As will be hereinafter explained, it is desirable and in most instances necessary, to use different sized cultivating hoe members 29 for different spacements of plants in their rows. This is definitely so when cultivation is to be predeterminedly close to plants. Further different spacements of plants to be cultivated requires, as will be presently understood, different sized countershaft (20) driving sprocket gears 19, 24. Therefore, I provide the rear bracket plate 17 with a sprocket chain tightener which takes the form of an idler sprocket gear 30 carried by the arm 31 which is pivoted on stud 32 carried by the rear bracket plate 17. A headed tightening screw 33 which is threaded in bracket 17 and passes through the arcuate slot 31a of arm 31 serves to retain the latter in different predetermined positions as required.

Figure 6:
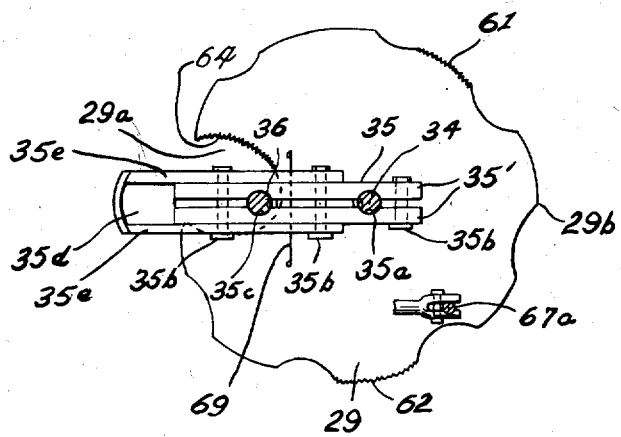
Fig. 6 is an enlarged sectional detail taken on the plane of line 6—6 of Fig. 1 and showing the cultivator member and its support in top plan.

The cultivator hoe member 29, per se, which has been referred to incidentally earlier herein, as shown in Fig. 6 may, as hereinafter explained, take a variety of forms depending upon whether it is intended to cultivate entirely about a plant or merely to chop out unwanted plants from a row. However, in its preferred form, for cultivating entirely about equally spaced plants in a row, it is a generally heart shaped and marginally notched plate having a relatively deep cutout 29a at its wider rear end. Cultivating plate 29 is preferably concavo-convex and has its concave face directed downwardly, it being fixedly carried by the lower end of the vertical shaft 34. The upper end of shaft 34 is carried by and is vertically adjustable in the end-adjacent seat 35a provided by the duplicate and horizontal crank element (35) providing clamp bar members 35' which are bolted together as at 35b.

The cultivator member-carrying crank element 35 is supported by the depending gear box (37)-carried driven shaft 36, the crank element defining bars 35' providing inwardly of their rear ends, as shown, a clamping seat 35c which receives driven shaft 36 so that crank element 35 can be adjusted vertically thereon.

As shown in Fig. 1, the crank bar element 35 has at its driven shaft supported end the counterweight 35d for the cultivator member 29 and its supporting shaft 34. The counterweight 35d has spaced parallel arms 35e through which the bolts 35b extend to secure it to crank bar 35.

Figure 3:
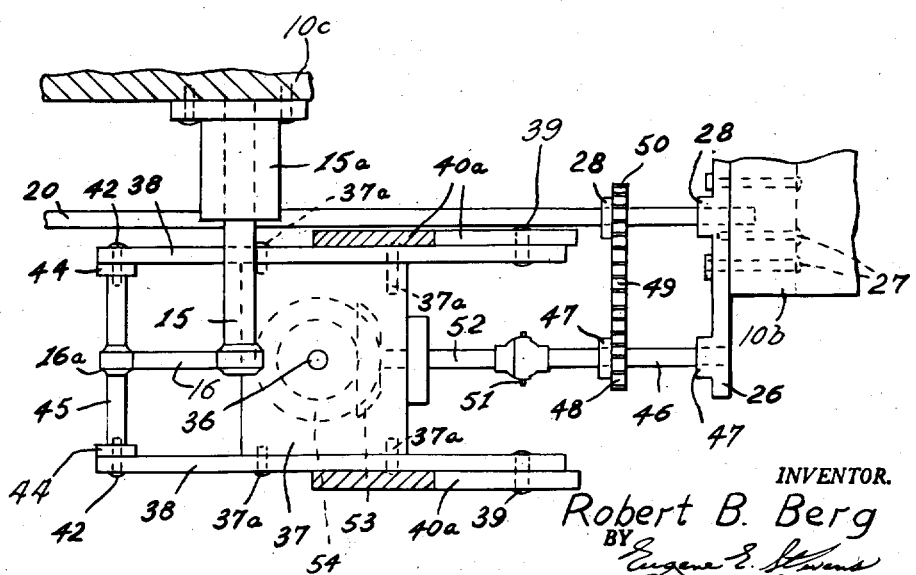
Fig. 3 is partial plan view of the cultivator attachment, taken on the plane of line 3—3 of Fig. 1 with certain parts in section and showing a forward portion of the tractor frame and transmission housing.

Strap metal bars 38 extending longitudinally of the tractor frame 10 are secured as at 37a to opposite sides of the gear box 37 to support the same, said bars 38 extending beyond the forward and rear ends of the gear box. The forward ends of the gear box supporting bars 38 are pivotally connected by short bolt and nut assemblies 39 (see Fig. 3) to the lower ends of the laterally spaced depending arms 40a of a U-form bracket 40. This bracket 40 has one of its legs 40a secured as at 41 to the conventional mounting pad 10c on the side of the transmission housing, as indicated in Fig. 1.

Inwardly extending pins 42 (Figs. 1 and 2) are fixedly secured in bearing enlargements 38a at the rear ends of said gear box-supporting arms or bars 38, and these pins 42 are slidably received in the elongated slots 43 of depending links 44. Nuts 42a threaded on pins 42 retain the parts assembled. The upper bearing- (44a) providing ends of links 44 are pivoted on the transversely extending horizontal shaft 45 which connects said arms and passes through the bearing 16a in the outer end of the earlier mentioned hydraulically operated lift arm 16 of the tractor. Thus, upward movement of lift arm 16 raises cultivator member 29 out of ground engagement.

The fact that the rear ends of the gear box carrying arms or bars 38 have the pins 42 working in the slots 43 of the pivoted depending links 44 enables the entire gear box and cultivator member 29 assembly to rock upwardly in case the cultivator hoe element 29 strikes an obstruction such as a root or a large stone. Otherwise the weight of said assembly maintains it in operative position.

Figure 4:
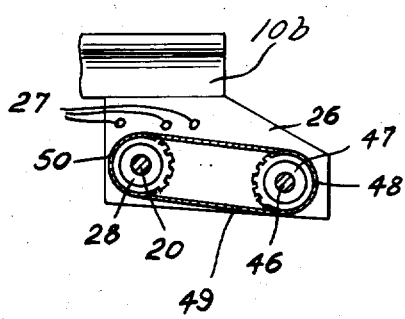
Fig. 4 is a sectional detail taken on the line 4—4 of Fig. 1.
Figure 5:
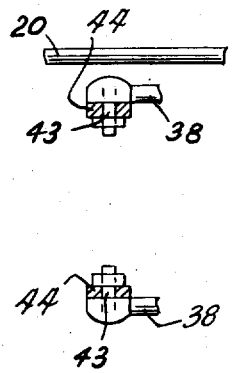
Fig. 5 is a sectional detail taken on the line 5—5 of Fig. 1.

Coming now to the drive means for the vertical gear box-carried shaft 36 which drives the crank arm (35) supported cultivating member 29, it will be noted from an inspection of Figs. 1 and 4 that the countershaft- (20) supporting bracket 26 has adjacent its lowered outer end a second bearing 47. In this second and lower bearing 47 is journalled the forward end of a short shaft 46. This short shaft 46 has keyed thereon the sprocket gear 48 which is driven by means of sprocket chain 49 from the sprocket gear 50 which is keyed on the countershaft 20, as indicated in Fig. 1.

The rear end of the short shaft 46 has a universal or horizontal pivot providing joint connection 51 with the shaft 52 which is journalled in gear box 37. The horizontal axis of the universal joint 51 coincides with the axis of the pivot pins 39 which support the gear box carrying arms or bars 38. Thus, when the gear box and cultivator member assembly 37, 29 is lifted or swung upwardly, there will be no binding at the site of the universal joint 51 connection between shaft members 52, 46. Within the gear box 37 the shaft 52 fixedly carries a bevel pinion 53 which meshes with a bevel gear 54 that is fast on the depending gear box-carried driven shaft 36.

From the foregoing it will be apparent that the weight of the cultivating member assembly 29, 34, 35, etc., will normally maintain the cultivator member 29 in operative cultivating position partly below the ground level of the soil. It will also be clear that when the lift shaft 15 of the tractor is rocked in a clockwise direction as viewed in Fig. 1, the gear box and cultivating member assembly, along with the driven shaft element 52, will be swung upwardly about 39, 51 as the pivot point.

Referring back to the cultivating member or hoe 29 and to the illustration thereof in Figs. 1 and 2, it will be noted that its crank arm-supported carrier shaft 34 is secured in the socket member 55, which is fastened as at 55a to the top surface of said hoe member 29 at about the center thereof.

Turning now to Fig. 9, the cultivating hoe 29 is shown in its starting position with its foremost end portion 29b spaced a predetermined distance, say about one inch, from the stalk 56a of the first plant 56 in a row which latter is indicated by broken line 58. It is also to be noted from an inspection of Fig. 6 that the longitudinal axis of crank 35, the axis of its drive shaft 36 and that of the crank carried hoe-supporting shaft 34 coincide with the longitudinal center line of the hoe 29, which center line is indicated in Fig. 9 by the dot and dash line 59. Fig. 9 further indicates that in said starting position of the hoe 29 adjacent the first plant 56, the longitudinal center line 59 of said hoe 29 is aligned with the plant row 58.

As previously indicated the plants 56, 57, etc., in each row are equally spaced, and since a thirteen inch spacement is satisfactory for cabbage, peppers, etc., the plants, for purposes of discussion herein, will be considered to be so spaced. But whatever the plant spacement, the hoe-carrying crank 35 must, as will be presently understood, make one complete revolution from its forward-dead-center position of Figs. 1 and 6 and back to that position as the tractor moves continuously forward a distance corresponding to the plant spacement, here considered as thirteen inches. Thus it follows that by the time the tractor has moved forward six and one half inches, which is to say a distance equal to one half the distance between plants, the hoe-carrying crank 35 will have completed one half a revolution. In other words, said crank 35 and hoe 29 will have moved from the forward dead center position of Figs. 1 and 6 to the rear dead center position which is indicated by the full line position of hoe 29 in Fig. 10.

There is, of course, a fixed ratio of rotation between the tractor's power takeoff shaft 14 (Figs. 1 and 2) and the rear drive wheels 13 of the tractor. Thus, it is a simple matter to so vary the ratio between the countershaft driving gears 19, 24 (Fig. 2) by change of the same, as to assure of the hoe-carrying crank 35 making one complete revolution while the tractor is moving forward a distance corresponding to different plate spacings.

As will be understood from the dotted line showing in Fig. 9, when the tractor moves forwardly with the power takeoff control lever 21 in its "drive" position and the hoe 29 in its Figs. 1 and 9 starting position, the hoe-carrying crank 35 swings rearwardly in the direction of the arrow 60 of Fig. 9. During the 180 degree rearward swing of crank 35 the oppositely inclined or initially trailing exterior hoe side edge 61 of Fig. 9 cultivates rearwardly of and closely adjacent the first plant stalk 56a. Then, as shown by dotted lines in Fig. 10, when the crank 35 swings 180 degrees forwardly from its rear dead center position of Fig. 10, it is the edge 64 of the rear hoe recess 29a which cultivates close to the side and forward portions of the plant stalk 56a to complete cultivation completely around the same.

Figs. 9 and 10 also show that during each 360 degree cycle of movement of hoe 29, its leading exterior side edge 62 as well as its trailing exterior edge 61 is cultivating the space between plants of the row as well as path portions at opposite sides thereof. Furthermore, it will be clear from Fig. 10 that while the trailing hoe edge 61 is cultivating closely to the stalk of the second plant 57 the leading hoe edge 62 will be re-cultivating close to the stalk of the first mentioned plant 56.

For the better cutting of weeds and for more efficient cotton chopping and beet thinning, the relatively sharp exterior hoe edges 61, 62 as well as the edge 64 of the cutout 29a are serrated as indicated at 65.

When it is desired to cultivate very closely about the plant stalks such as 56a, say one inch therefrom as indicated by the broken line circles 56b in Figs. 9 and 10, the length of the hoe member 29, as indicated by its longitudinal center line 59, will be approximately eleven inches for the thirteen inch spacement between plants. This means that there will be left, fore and aft of hoe 29, a one inch clearance between same and adjacent plants 56, 57, as indicated in Fig. 10.

However, when very close cultivation to plant stalks 56a, 57a is not deemed desirable, the length of hoe 29, as compared to plant spacement will be proportionately less and the size of the rear hoe cutout 29a proportionately greater. In such circumstances the ratio of the countershalt (20) driving sprocket gears 19, 24 need not be changed except for a different plant spacement. However, for materially different plant spacements, different sized hoes 29 will be ordinarily required; and invariably differently ratioed countershaft driving sprocket gears 19, 24 will be required for each different plant spacement.

From what has been said earlier herein about the Figs. 9 and 10 showing of 360 degree cultivation about the plant stalks such as 56a and 57a, it will be understood that it is a two phase operation. The first phase is the close cultivation to the first plant stalk 56a and rearwardly thereof, by the trailing exterior side hoe edge 61 as hoe 29 and crank 35 swing 180 degrees rearward from the forward dead center position of Fig. 9 to the rear dead center position of Fig. 10. The second phase of the close-to-plant stalk-cultivation commences as the hoe 29 and crank 35 start swinging forwardly from the rear dead center position of Fig. 10 back to the forward dead center position of Fig. 9. It is during this latter period that the edge 64 of rear hoe cutout 29a cultivates closely to plant stalk 56a, as previously indicated.

Considering the first phase of the close-to-stalk cultivation of the immediately adjacent and next forwardly located plant by the exterior and trailing hoe edge 61 as shown in Fig. 9, it is to be noted that said edge 61, beginning a the forward end 29b of the hoe, curves outwardly and rearwardly in a generally counterclockwise direction, but so that said edge 61 progressively approaches the line of the axis of the crank-driving shaft 36.

The aforementioned progressive and generally counterclockwise recession of exterior hoe edge portion 61 toward the axis of the crank driving shaft 36 is such as to fully compensate for the initial outward movement and subsequent inward movement of hoe 29 by crank 35 as it follows its 180 degree clockwise path from forward dead center to rear dead center. Said hoe edge 61 also cooperates with crank 35 in the provision of what amounts to such rearward movement of the active close-to-plant cultivating portions of said edge 61, as will at all times offset or compensate for such forward movement of the tractor and hoe 29 as takes place while the crank-carrying hoe is being moved 180 degrees rearwardly from the forward dead center position of Fig. 9 to the rearward dead center position of Fig. 10.

Thus, as the tractor moves continuously forward while the crank carried hoe 29 swings continuously 180 degrees clockwise from the Fig. 9 position about the crank-driving shaft 36 as an axis, successive portions of the exterior hoe edge 61 will come into tangency with the imaginary circle 56b rearwardly of the plant stalk 56a as indicated by the dotted line positions of hoe 29, as shown in Fig. 9.

At the start of the second phase of close-to-plant stalk cultivation of the first plant 56, beginning from the rear full line-indicated dead center crank position of Fig. 10, said plant 56, as shown, is opposite the opening to the forwardly directed rear cutout 29a of the hoe. As the tractor moves forwardly, the crank-carried hoe 29 swings clockwise forwardly and initially outwardly. The dotted line hoe (29) showings of Fig. 10 indicate how portions of the concavedly extending cultivating edge 64 of cutoff 29a, beginning with edge end 64a, are successively brought into tangency with different portions of the imaginary circle 56b about plant stalk 56a.

Cultivation by recess (29) edge end 64a commences at a side margin of the stalk-adjacent area previously cultivated by exterior hoe edge 61. Succeeding portions of recess edge 64 effect cultivation from said previously cultivated area margin forwardly entirely about the plant stalk 56a to the opposite side margin of said area which has been previously cultivated by exterior hoe edge 61. This substantially horse-shoe path cultivation about the plant stalk 56a by recess edge 64, and tangent to imaginary circle 56b about said stalk, while both the tractor and crank 35 are moving forwardly is made possible (1) by the outline of said recess edge 64; and (2) by reason of the fact that said edge 64 extends around the line of the axis of the crank-driving shaft 36 as shown. Or differently expressed, the second factor in producing said result is achieved by reason of the fact that said shaft 36 is aligned with the rear portion of hoe recess 29a.

From point 64a recess edge 64 inclines toward the line of the axis of shaft 36, then rearwardly of same and finally recedes forwardly and outwardly away from said shaft 36 axis. Thus, allowance is made for both the forward travel of the tractor and the forward swing of the hoe-carrying crank 35 back to its forward dead center position. As is shown in Fig. 10, when the crank 35 and hoe 29 have returned to forward dead center position, the rear hoe cutout 29a has drawn away from the first plant 56 and the forward end 29b of the hoe is in the starting position for the cultivation about the second plant 57.

Of course, initial cultivation close to the second plant 57 and succeeding plants takes place as described in connection with the first plant 56. But as intimated earlier herein, Fig. 10 clearly indicates (1) that the leading hoe edge 62 is approachingly cultivating rearwardly of the next forwardly located plant while recess edge 64 is cultivating the adjacent rearwardly located plant; and (2) that the leading hoe edge 61 is re-cultivating close to and forwardly of an adjacent rearwardly located plant (not shown) while the trailing hoe edge 62 is cultivatingly closely adjacent the forwardly located plant (see Fig. 9).

Regarding the close-to-plant stalk cultivating hoe provided edges 61, 62 and 64, it will be obvious that the illustrated contours thereof are not critical except possibly when cultivation tangent to the imaginary circle 56b about a plant stalk as a center is to be effected with the hoe 29 driven in a true circle. In such a case, as illustrated herein, there must be inclinations of said cultivating edges 61, 62 and 64 such as will compensate for outward and inward swinging travel of said edges 61, 62 and 64.

However, expressions of the invention other than that herein illustrated but where there is cultivation effected by cultivating member portions which move about the plant 56 and which are constantly driven independently of, and in addition to the forward movement thereof under the action of the prime mover (tractor), one condition is definitely necessary. This is that after the prime mover has advanced a distance equal to one half of the spacement between equally spaced plants 56, 57, subsequently active cultivating member portions of such as cutout edge 64 must be so directed and so arranged as to traverse a generally circular path from one rear side of the plant stalk to the other and about the plant stalk as an approximate axis. Such operation is necessary to compensate for both the forward movement of the tractor and the additional forward movement of said cultivating portions.

On the basis of a thirteen inch spacement of plants such as 56, 57 it will be understood that for each ½ inch of forward tractor movement the hoe 29 makes 1/26 of its complete 360 degree turning movement. Thus, hoe 29 will have turned 13/26 of a complete movement cycle, or 180 degrees when the tractor has traversed forward 6½ inches, or a distance equal to one half the spacement of the plants.

Obviously, in the form of hoe used merely for chopping out or thinning out plants from a row it will be relatively shorter than the illustrated hoe 29, as compared to plant spacement and the rear end recess or cutout, 29a, will not be necessary.

For better cultivation adjacent the plants 56, 57, I provide the hoe 29 with the short and transversely extending cultivating lip or edge 69, inwardly of the hoe cutout or recess 29a.

Also, as indicated in Fig. 1, the gear box 37 has secured thereto as at 66 a suitable support 67a for a depending scraper member 67 which overlies the hoe 29 to prevent weeds, etc., from being carried around by same.

Adjustment of hoe 29 for various cultivation depths is made possible by vertical adjustment of the hoe-carrying shaft 34 with respect to crank 35.

It is important to note that the offsetting of hoe-carrying shaft 34 from the crank-driving shaft 36 avoids damage to plants as shaft 34 will always be between plants or to one side of same. Also the alignment of the offset shafts 34, 36 with the longitudinal axis of the hoe 29 is an important factor in achieving complete cultivation about plants.

Further, it is important to note that the operation of the hoe 29 is in full view of the tractor operator.

Operation

To get in position to cultivate a row of plants, the tractor operator will approach in line with the row with the lift arm 16 of the tractor raised so that hoe 29 is out of ground contact.

Then when about six inches from the first plant 56 of the row, he stops the tractor and operates lever 68 (Fig. 1) to lower lift arm 16 sufficiently to dispose the rotary hoe 29 to, or slightly above, the ground surface. Now, with the tractor stationary, he manipulates the cultivator hoe drive control lever 21 of Fig. 1 to line up the hoe 29 with the row as indicated in full lines in Fig. 9. Then with the power takeoff controlling hoe drive lever 21 in inoperative position, he actuates the tractor forwardly and stops it when the forward end 29b of hoe 29 is properly spaced from the first plant 56, as indicated in full lines in Fig. 9. Lift arm 16 is now operated to lower hoe 29 to the desired cultivating depth in the soil. The cultivating hoe driving power takeoff shaft 14 is now started by operation of lever 21 (Fig. 1) as the tractor is also started and the tractor proceeds down the plant row. Complete cultivation 360 degrees around each successive plant in the row is effected, as indicated in Figs. 9 and 10 as earlier described herein. Should a large stone or root be encountered, the slots 43 in the lift arm-supported links permit the hoe (29) assembly to rock upwardly about 39 as a pivot and then fall back again to operating position when the obstruction has been passed.

When the end of a row of plants has been reached, the lift arm is, of course, operated to raise the hoe 29 assembly while the tractor is being turned for the approach to the next row.

Having thus described my invention, what I claim is:

1. The combination with a mobile unit adapted to be moved along a row of uniformly spaced plants; of a substantially horizontally disposed cultivating member providing forward and rear ends and being of a length less than plant spacement, said cultivator member providing a first marginal cultivating edge extending rearwardly from its forward end at one side and also having an arcuate recess opening at its rear end, the edge of said recess providing a second cultivating edge, an upstanding post fixedly carried by the top of said cultivating member approximately midway between its forward end and said rear end recess and in substantial alignment with same, a substantially horizontal crank member to one end-adjacent portion of which said post is secured adjacent its free end to align the forward cultivating member end and rear end recess with the crank axis, a substantially vertically journalled mobile unit-carried shaft on which the other end-adjacent portion of said crank is fixed, to align the axis of said shaft with said cultivating member recess and to dispose the forward cultivator member end forwardly when the crank is in forward dead center position, successive portions of said first cultivating edge commencing at the forward cultivating member end approaching progressively closer to the line of said shaft axis, a bearing-providing support for said shaft, mobile unit-carried drive means for said shaft and operative to turn the same one complete revolution for each plant spacement distance travelled by the mobile unit in a forward direction, whereby when the mobile unit moves forwardly with said shaft axis substantially aligned with the plant row and commencing with the forward end of the cultivating member in rearward adjacency to the first plant in the row, said first cultivating edge will cultivate rearwardly of said plant as the unit continuously advances and while the crank is moving 180 degrees rearwardly, said cultivator member-provided recess upon, completion of said 180 degree shaft turn being in rearward adjacency to said first plant for cultivating about the same as the mobile unit continues forwardly and said shaft completes its turn to dispose the forward cultivating member end adjacent the next plant.

2. In combination with a mobile unit providing a frame and a driven power take-off means, which latter has a predetermined r.p.m. relationship to the rate of forward travel of said mobile unit, means for cultivating between and entirely about equally spaced row plants during a single trip of said mobile unit down said row and comprising a bearing-providing member carried by said mobile unit frame, a vertically journalled crankshaft carried by said bearing member and providing a laterally extending crank arm adjacent its lower end, a substantially horizontally disposed cultivating member providing forward and rear ends and having a forwardly extending arcuate recess opening from its rear end, the distance between said forward and rear cultivator member ends being less than the spacement of said plants, an upstanding carrier post fixedly carried by said cultivator member approximately midway between its front and rear ends and substantially aligned therewith, said post secured to said crank arm at a point to effect alignment of the axis of said crank shaft with said rear cultivator member recess and to dispose said forward cultivator member end forwardly when the crank is in forward dead center position, a rearwardly and laterally extending first cultivating portion provided by said cultivating member and extending from its forward end to a point adjacent one side of said rear end recess, successive outer marginal areas of said first cultivating portion commencing at the forward cultivator member end progressively approaching the axis of said crank shaft, the edge of said recess providing a second cultivating portion, and an operative connection between said power take-off means and crank shaft and effective to cause the crank shaft to make one complete revolution as the mobile unit advances a predetermined plant spacement distance, whereby when the mobile unit is driven down a row of equally spaced plants with said crank shaft aligned therewith and starting with the forward cultivator member end in rearward adjacency to the first plant, the first cultivating portion will successively cultivate rearwardly and laterally of the plants and the second cultivating portion will successively cultivate entirely about the same.

3. The structure of claim 2, and means securing said crank arm to said vertically journalled driving shaft for vertical adjustment with respect to the latter.

4. The structure of claim 2, and means securing said cultivator member carrier post to said crank arm for vertical adjustment with respect to the latter.

5. The structure of claim 2, and means securing said crank arm to said vertically journalled driving shaft for vertical adjustment with respect to the latter, and means securing said cultivator member carrier post to said crank arm for vertical adjustment with respect to the latter.

6. The structure of claim 2, and pivot means extending transversely of said mobile unit frame and pivotally connecting said bearing-providing member thereto at one side of said crank shaft, manually operated mobile unit-carried control means operatively connected to said bearing-providing member for maintaining the latter in different positions, and said manually operable bearing member control means including a portion which is yieldable in an upward direction so that the bearing-providing member will swing upwardly in the event of the cultivator member striking a rock or analogous obstruction.

7. The combination set forth in claim 2, and said mobile unit comprising a farm tractor having a manually controlled lift arm, and an operative connection between said lift arm and the bearing-providing member of said crank shaft, whereby the cultivator member can be swung in a vertical plane to and from operative position.

8. The combination set forth in claim 2, and said mobile unit comprising a farm tractor having a manually controlled lift arm, and an operative connection between said lift arm, and the bearing-providing member of said crank shaft, whereby the cultivator member can be swung in a vertical plane to and from operative position, and a lost motion connection between said lift arm and shaft support, permitting upward swinging movement only of said shaft support and cultivating member, as when the latter encounters a rock, root, or other obstruction.

9. In a farm tractor having a power plant-carrying frame, there being power plant driven frame-supporting means for propelling the tractor over the ground and a power plant-driven power takeoff at the rear end of said frame, said power takeoff having a fixed r.p.m. relationship to the rate of forward travel of the tractor, a forwardly extending clutch-controlled and frame-carried countershaft driven by said power takeoff, the forward portion of said frame providing a depending bracket-provided bearing for the forward end of said countershaft, and a manually controlled implement lift member carried by said frame rearwardly of said countershaft bearing-providing bracket; the combination of an implement-supporting frame, a second-depending tractor frame-carried bracket, horizontal pivot means connecting the forward end of said implement-supporting frame to said second bracket for vertical swinging movement, depending link means pivoted at its upper end to said lift member and providing a longitudinally extending slot closed at each end, pivot-providing means carried by the rear end of said implement-supporting frame and longitudinally slidable in said link means slot whereby said implement-supporting frame can be elevated and lowered by said lift member and is also free to swing upwardly relatively of the latter, a depending implement-actuating shaft rotatably journalled in said implement-supporting frame, a laterally extending crank secured adjacent one end to said implement drive shaft and adjustable longitudinally thereof, a ground-cultivating implement, an upstanding carrier post for said implement, clamp means provided by said crank adjacent its second end and in which said implement-supporting post is vertically adjustable, a forwardly projecting driven shaft journalled in said implement-supporting frame and operatively connected to said depending implement-actuating shaft, a rearwardly-extending countershaft-driven shaft journalled in said first mentioned tractor frame-carried bracket, and a horizontal pivot-incorporating drive connection between said last mentioned shaft and the forwardly projecting implement frame-carried shaft, said pivot connection being aligned with said implement frame and bracket-connecting pivot means so that the implement actuating shaft can be driven at all positions of the implement-supporting frame.

10. The combination set forth in claim 5, and the drive connection between said power takeoff and said countershaft comprising sprocket chain-connected and replaceable sprocket gears of a predetermined ratio, said gear ratio being selected to effect one complete turn of said implement actuating shaft while the tractor is travelling forward a predetermined distance, said cultivator member having first and second cultivating edge portions, the first cultivating edge portions being arranged to successively operate to cultivate partly about each of a series of equally spaced fixed points in the path of travel of the tractor as it moves forwardly while the implement carrying crank swings rearwardly, and the second cultivating edge portions being arranged to successively operate to complete cultivation entirely about each of the respective fixed points as the tractor continues forwardly and during forward swinging of said implement-carrying crank.

11. The combination set forth in claim 9, and the drive connection between said power takeoff and said countershaft comprising sprocket chain-connected and replaceable sprocket gears of a predetermined ratio, and which ratio is selected to effect one complete turn of said implement-actuating shaft while the tractor is travelling forward a predetermined distance, an adjustable tractor frame-carried tightener member for said sprocket chain, and said cultivating implement having means operable during each revolution of its continuously actuating shaft and while the tractor continues forwardly to successively cultivate entirely around each of a series of fixed and equally spaced points in the path of travel of the tractor.

12. The combination set forth in claim 9, and the drive connection between said power takeoff and said countershaft comprising sprocket chain-connected and replaceable sprocket gears of a predetermined ratio, and which ratio is selected to effect one complete turn of said implement-actuating shaft while the tractor is travelling forward a predetermined distance, and said cultivating implement having means operable during each revolution of its continuously driven actuating shaft while the tractor continues forwardly to successively cultivate entirely around each of a series of fixed and equally spaced points in the path of travel of the tractor.

13. A tractor having a power take off constructed to drive at a speed synchronized to the speed of travel of the tractor, a countershaft constructed to be driven by said power take off, means on said countershaft for driving a second shaft, a U-shaped support fastened to said tractor, a pair of arms having ends pivotally connected to the free end of said support, an implement lift member having depending arms with slots therein connected to the opposite end of said pair of arms by pivots slidable within said slots whereby said arms may be elevated and lowered and said slots caused to provide a lost motion for the free upward movement of said arms, gearing carried by said pair of arms, a universal joint connecting said gearing to said second shaft, a substantially vertical drive shaft depending from said gearing, a laterally extending crank mounted on said drive shaft and adjustable axially thereof, a post depending from said crank, means carried by said crank for adjusting the height of said post, a generally circular cultivating implement fixed to the lower end portion of said post, said implement having a recess and a diameter less than the spacing between plants evenly spaced in a row whereby the earth will be cultivated entirely around said plants.

14. A tractor having a power take off constructed to drive at a speed synchronized with the speed of travel of the tractor, a countershaft adapted to be driven by said power take off, means operatively connected to said countershaft for driving a second shaft, a support attached to said tractor, a pair of arms pivotally connected to said support, a lift member having arms, a lost motion connection between said pair of arms and the arms of said lift member whereby said arms may be elevated and lowered and may have free upward movement due to said lost motion connection, gearing attached to said pair of arms, a universal joint for connecting said gearing to said second shaft, a substantially vertical drive shaft depending from said gearing, a laterally extending crank mounted on said drive shaft and adjustable axially thereof, a post depending from said crank, means carried by said crank for adjusting the height of said post, a cultivating implement fixed to the lower end of said post, said implement being of a size less than the spacing between plants evenly spaced in a row and adapted to encircle each of said plants to cultivate the earth entirely around the plants.

References Cited in the file of this patent

UNITED STATES PATENTS

| 2,560,443 | Hosford | July 10, 1951 |
| 2,610,559 | Peel | Sept. 16, 1952 |
| 2,713,816 | Berg | July 26, 1955 |
| 2,764,077 | Pertics et al. | Sept. 25, 1956 |
| 2,791,953 | Erickson et al. | May 14, 1957 |

FOREIGN PATENTS

| 967,149 | France | Mar. 22, 1950 |